Figure 1:
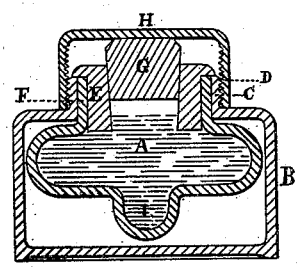

S. DARLING.
INKSTAND.

No. 176,776          Patented May 2, 1876.

Witnesses
John C. Hall
Edwin J. Peirce Jr

Inventor
Samuel Darling

UNITED STATES PATENT OFFICE.

SAMUEL DARLING, OF PROVIDENCE, RHODE ISLAND.

IMPROVEMENT IN INKSTANDS.

Specification forming part of Letters Patent No. 176,776, dated May 2, 1876; application filed December 6, 1875.

*To all whom it may concern:*

Be it known that I, SAMUEL DARLING, of Providence, in the State of Rhode Island, have invented certain Improvements in Inkstands; and I do hereby declare that the following, taken in connection with the drawing which accompanies and forms part of this specification, is a description of my invention, sufficient to enable those skilled in the art to practice it.

My improvement consists in making a portable inkstand, consisting of a rubber fountain, a metallic case surrounding the fountain, a rubber stopper or its equivalent, and a screw-cap that secures the cork in its place, the construction and arrangement of which will be fully described and set forth in the following drawing and specification, in which—

Figure 2:
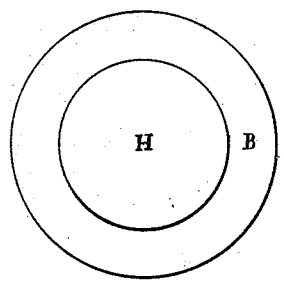

Figure 1 represents a central vertical section; Fig. 2, a plan of same.

In the drawing, the letter A represents the fountain or ink-reservoir, made of rubber on account of its being tight, and not liable to be broken by the freezing of the ink; B, metallic case containing the rubber fountain; C, the neck of the case, on which is cut a screw, as shown at D; E, a dipping-tube made of glass, hard rubber, or other suitable material—I preferably make it of glass; F, neck of the rubber fountain, which is to be between the dipping-tube and the neck of the case. The dipping-tube is made sufficiently large to fill the neck of the rubber tightly, making a perfectly water-tight joint between the rubber and dipping-cup, and the rubber and the neck of the case. G, the rubber stopper; and H the screw-cap which secures the stopper in its place, and makes an ink-tight joint between the lower end of the cap and the case. Good rubber makes the safest stopper for an ink-bottle that can be had when properly inserted. I, a narrow recess in the bottom of the ink-reservoir, to clear the point of the pen, and enable the writer to use all of the ink in the main part of the reservoir, without having the point of the pen come in contact with the bottom, or with sediment.

No dependence can be put upon the inkstands where an elastic cap is merely screwed onto the mouth of the bottle. With truth it may be said that there is not an inkstand in market that can be relied upon to carry in the trunk or valise. It is evident that my improved inkstand can be used for that purpose with safety, and will supply a need long felt by travellers.

Having thus fully described my improvement, what I claim, and wish to secure by Letters Patent, is—

The combination, in an inkstand, of an elastic ink-reservoir or fountain, a metallic case surrounding the elastic fountain, an elastic stopper, and a screw-cap, substantially as described, and herein set forth.

SAMUEL DARLING.

Witnesses:
JOHN E. HALL,
HENRY R. DAVIS.